United States Patent [19]

Getman

[11] 4,189,289
[45] Feb. 19, 1980

[54] METHOD AND APPARATUS FOR PRODUCING AND PROCESSING FROZEN CONFECTIONS

[75] Inventor: Harlan R. Getman, Toledo, Ohio

[73] Assignee: Vroman Foods, Inc., Toledo, Ohio

[21] Appl. No.: 882,574

[22] Filed: Mar. 2, 1978

Related U.S. Application Data

[62] Division of Ser. No. 781,698, Mar. 28, 1977, abandoned.

[51] Int. Cl.² .................. A23G 3/24; A23G 9/26
[52] U.S. Cl. .................................. 425/93; 425/100
[58] Field of Search .......... 425/90, 91, 112, 215, 425/217, 384, 385, 269, 270, 93, 96, 100, 101, 102, 103, 106, 383, 110; 164/324, 329; 426/293, 101

[56] References Cited

U.S. PATENT DOCUMENTS

| 1,010,174 | 11/1911 | Pooley | 425/100 |
| 1,718,997 | 7/1929 | Burt | 426/101 |
| 1,936,584 | 11/1933 | Cobb | 425/93 |
| 1,960,456 | 5/1934 | Robb | 425/93 |
| 2,032,812 | 3/1936 | Quattrin | 425/100 |
| 3,060,057 | 10/1962 | Johnson | 425/269 X |
| 3,063,361 | 11/1962 | Gehrke | 425/DIG. 230 |
| 3,228,357 | 1/1966 | Bruschke | 426/293 |
| 3,580,188 | 5/1971 | Lutsey | 425/93 X |
| 3,648,625 | 3/1972 | Glass | 425/93 X |

Primary Examiner—Richard B. Lazarus
Assistant Examiner—John S. Brown
Attorney, Agent, or Firm—Harry O. Ernsberg

[57] ABSTRACT

The disclosure embraces a method of and apparatus for producing and processing frozen confections or desserts wherein bodies or discs of frozen confection or dessert, such as ice cream, ice milk or other edible material mounted on sticks are advanced through successive stations at which method steps are performed in which a chocolate composition in liquid form is sprayed onto the frozen bodies, the chocolate-coated bodies advanced a sufficient distance whereby the chocolate coating is congealed under the influence of the reduced temperature of the bodies, the coated bodies then subjected to controlled heat to render the chocolate coating in a softened, tacky or viscous condition and advancing the coated bodies through a chamber in which particulate edible materials, such as chopped nuts, nut pieces, fragments of edible cake or the like are impinged against the softened chocolate coating whereby a substantial amount of chopped nuts, nut pieces, cake fragments or the like are adhered to the chocolate coating.

9 Claims, 6 Drawing Figures

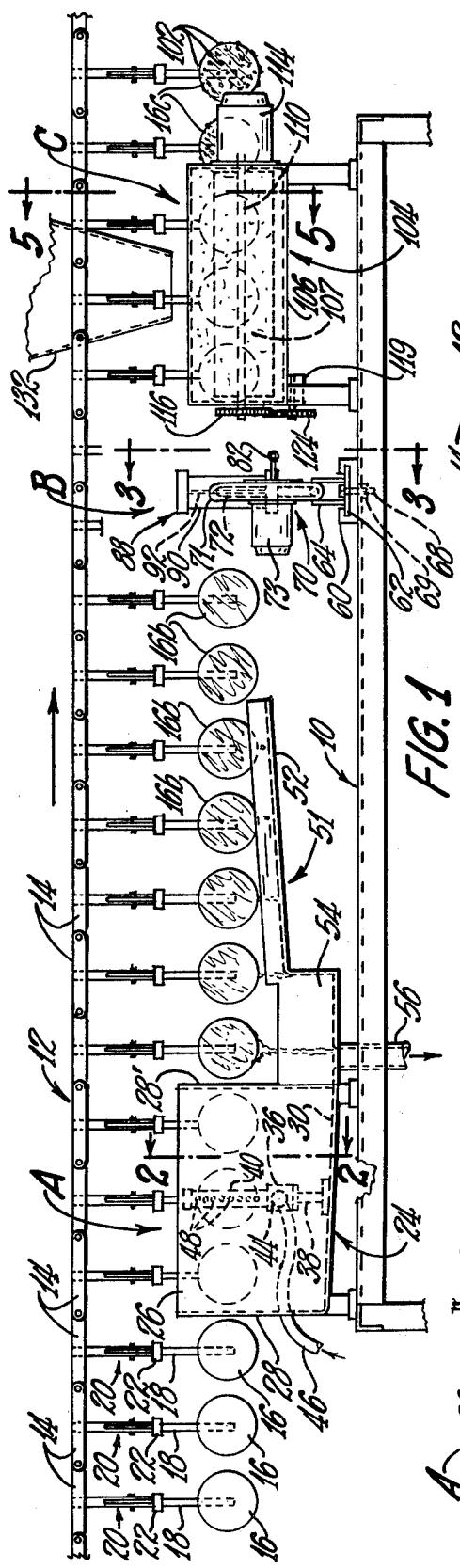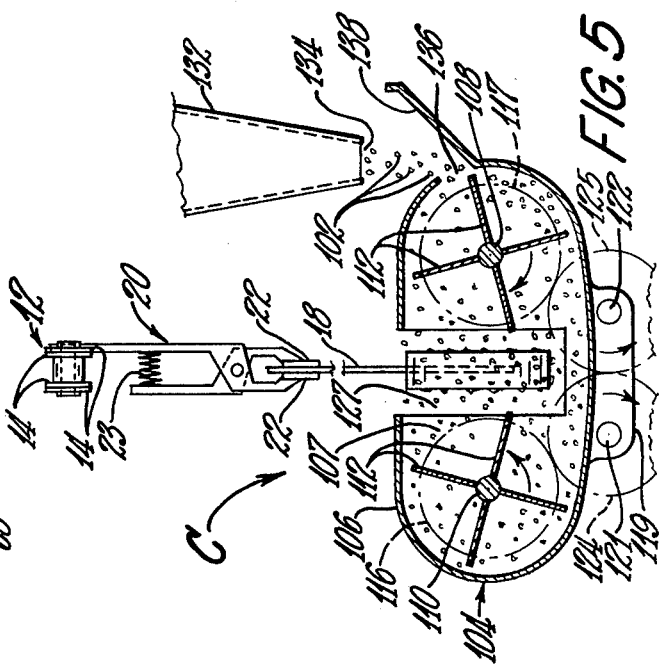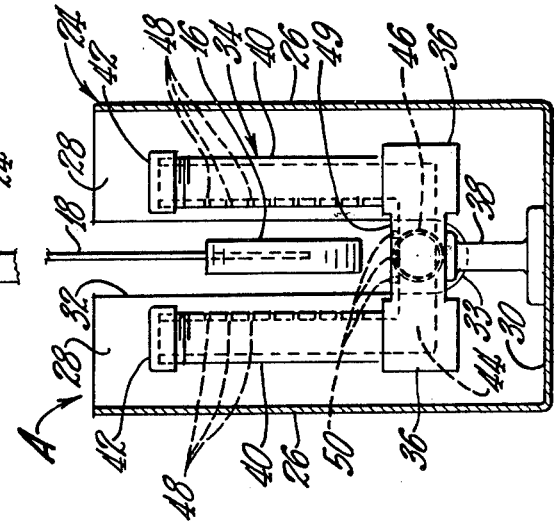

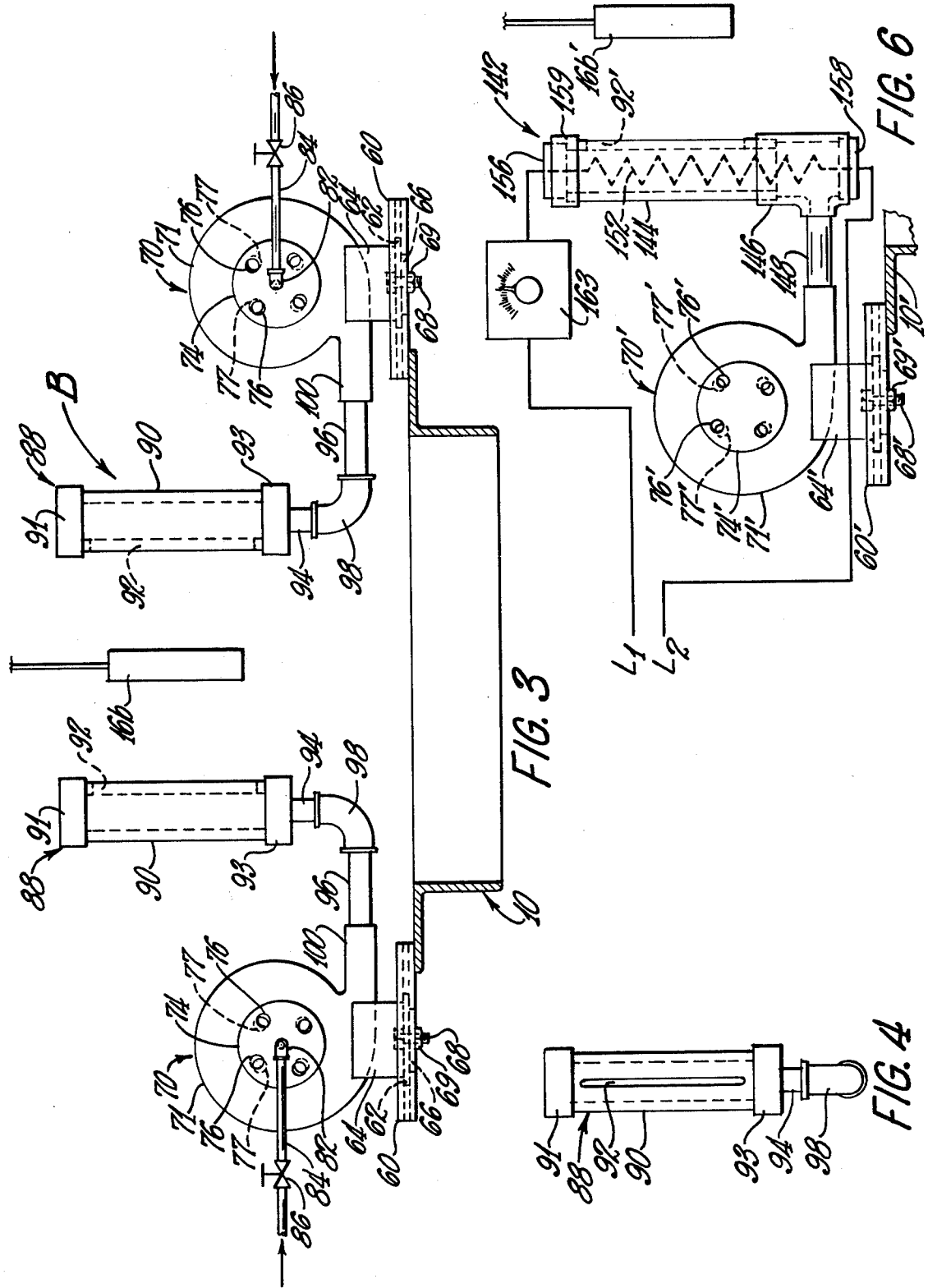

METHOD AND APPARATUS FOR PRODUCING AND PROCESSING FROZEN CONFECTIONS

This is a division, of application Ser. No. 781,698, filed Mar. 28, 1977, now abandoned.

The invention relates to a method of and apparatus for processing frozen confections or desserts and more especially to processing bodies of frozen confection or dessert mounted on sticks involving establishing a liquid coating material on the frozen bodies, congealing the coating material, heat-softening the coating on the bodies to render the coating tacky, and impinging or impelling particulate edible material, such as chopped nuts, nut pieces, fragments of edible cake or the like, onto the heat-softened coating on the bodies.

The invention has for an object the provision of a method of and apparatus for processing frozen bodies of ice cream, ice milk or other edible composition mounted on sticks including advancing the bodies by a conveyor through successive processing stations involving method steps of directing a liquid edible material onto the frozen bodies providing a coating of the material on the bodies, congealing or solidifying the coating under the influence of the reduced temperature of the frozen bodies, directing controlled heat against the congealed coating on the bodies to render the coating tacky, and impinging chopped nuts, nut pieces, fragments of edible cake or the like against the tacky coating material whereby the chopped nuts, nut pieces or cake fragments adhere to the tacky coating.

Another object of the invention involves applying liquid chocolate onto disc-like bodies of frozen confection or dessert being advanced through processing stations wherein the bodies are moved through a distance sufficient to congeal the chocolate coating on the bodies, conveying the coated bodies through a heated environment established by flames of burning hydrocarbon gas to soften the chocolate coating and thereby render the chocolate coating tacky and, while the coating is in tacky condition, passing the bodies through a chamber in which chopped nuts, nut pieces or fragments of edible material are impinged against the tacky coating whereby substantial amounts of the chopped nuts, nut pieces or fragments of edible material adhere to the tacky chocolate coating.

Another object of the invention resides in a method of and arrangement for continuously conveying bodies or discs of ice cream, ice milk or other edible composition frozen on sticks and suspended from a movable conveyor whereby the bodies or discs are continuously conveyed without interruption through a plurality of processing stations at which a liquid edible coating material is applied to the bodies or discs, the coating congealed, controlled heat applied to the coating on the discs rendering the coating tacky, and impelling or impinging chopped nuts, nut pieces or fragments of edible material onto the tacky coating on the bodies or discs.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic side elevational view of an apparatus for processing bodies of frozen confections or desserts and illustrating method steps or stations of the process;

FIG. 2 is an enlarged sectional view taken substantially on the line 2—2 of FIG. 1;

FIG. 3 is an enlarged sectional view taken substantially on the line 3—3 of FIG. 1 illustrating heat applying means;

FIG. 4 is a front view of one of the heat applying means shown in FIG. 3;

FIG. 5 is an enlarged view taken substantially on the line 5—5 of FIG. 1, and

FIG. 6 is a modified arrangement of heat applying means.

Referring initially to FIG. 1 of the drawings, there is illustrated semischematically a frame construction mounting apparatus at the several processing stations and an endless conveyor for conveying frozen bodies or discs of edible materials, dairy products such as ice cream, ice milk or compositions of edible materials, through the several processing stations. The apparatus includes a frame or frame construction 10 supporting processing units at the several processing stations.

An endless conveyor 12 has its upper flight disposed above the frame construction, the conveyor being mounted by conventional sprockets (not shown) and driven by an electric motor or other motive means (not shown). The endless conveyor 12 comprises connected links 14, the upper flight of the conveyor moving continuously in a right-hand direction as viewed in FIG. 1.

The frozen desserts, confections or products processed through the several stations are preferably in the form of circular bodies or discs 16, each of which may be about three inches in diameter and about a half inch or more in thickness. The bodies or discs 16 may be of other than circular configuration such as oval, rectangular, square or polygonal. Each body or disc is frozen upon a stick or support member 18 of wood or suitable plastic material and, during processing, are adapted to be suspended from links of the endless conveyor 12.

Secured to a link 14 of each pair of links is a spring clip 20 of conventional construction having jaws 22 urged toward closed position by a coil spring 23. Each pair of jaws 22 engages and supports a stick 18 in the manner illustrated in FIG. 5 whereby each body 16 is conveyed by the conveyor through the processing stations. It is to be understood that the edible bodies or discs 16 are in frozen condition during processing.

The several stations or steps of the method include applying liquid chocolate composition to the frozen bodies, conveying the coated bodies through a conditioning environment a distance effective to congeal the chocolate coating composition under the influence of the frozen temperature of the bodies, applying controlled heat effective to render the chocolate coating tacky on the bodies and adhering chopped nuts, nut pieces, fragments of edible cake or other comminuted edible material to the tacky chocolate coating.

The chocolate coating composition in liquid form is delivered onto the bodies as they move through station "A." Station "A" is inclusive of a receptacle or container 24, shown in FIGS. 1 and 2, the receptacle having side walls 26, end walls 28 and 28' and a floor or bottom 30.

As shown in FIG. 2, the end walls 28 are each fashioned with a vertical slot or passageway 32 providing spaces to accommodate passage of the frozen bodies or discs 16 of ice cream, ice milk or edible composition including ice cream or ice milk and their supporting sticks 18 through the container 24.

The slot 32 in the end wall 28 terminates as indicated at 33 above the container floor 30 as shown in FIG. 2. The slot in the end wall 28' terminates at the floor 30 of the container 24 for a purpose hereinafter explained.

Means is provided in the container for delivering or spraying a liquid chocolate composition onto the frozen bodies or discs of ice cream or ice milk as they are moved through the container by the conveyor 12 to form a layer or coating of chocolate on each body or disc 16. As particularly shown in FIG. 2, a means 34 for dispensing the liquid chocolate is inclusive of a tee-shaped fitting or hollow member 36 preferably mounted on a support 38.

Mounted on each branch of the fitting 36 and extending upwardly therefrom are tubular means or tubes 40, the upper ends of which are closed by caps or closures 42. The central tubular portion 44 of the fitting 36 is connected by a tube or pipe 46 with a pump (not shown) of conventional construction for pumping liquid chocolate to the fitting 36 thence upwardly through the tubes 40.

The adjacent wall regions of each of the tubes 40 is provided with a plurality of nozzle openings or orifices 48 through which liquid chocolate under the pressure of the pump sprays the liquid chocolate onto both major surface areas of each of the frozen bodies 16 and the liquid chocolate impinging the major surfaces of the bodies is splashed onto the peripheries of the frozen bodies.

Additionally, the central region of the upper wall 49 of the fitting 36 is provided with orifices 50, shown in broken lines in FIG. 2, through which the liquid chocolate composition is sprayed upwardly toward the peripheral surface of each of the frozen bodies to promote the formation of a coating of chocolate on such surface. In this manner the bodies or discs are completely coated with liquid chocolate composition.

As the frozen bodies move through and beyond the container or chocolate applying chamber 24, excess liquid chocolate drips from the frozen bodies until the reduced temperature of the frozen bodies congeals or solidifies a film or coating of chocolate on the frozen bodies. Means 51 is provided for collecting the excess liquid chocolate dripping from the bodies 16. The means 51 includes a channel-shaped trough 52 which is joined with a sump or sump portion 54, the latter being connected with the lower portion of end wall 28'. The trough portion 52 is inclined downwardly toward the sump 54 and the floor 30 of the container 24 is inclined downwardly toward the sump 54 as shown in FIG. 1.

As shown in FIG. 1, the bodies or discs 16, after receiving the coating of chocolate, are moved by the conveyor 12 through a substantial distance which is sufficient for the reduced temperature of the frozen bodies to solidify or congeal the chocolate coating on the bodies. During this period of movement of the bodies, the excess liquid chocolate drips from the bodies into the trough 52, the latter being of sufficient length to collect the chocolate dripping from the bodies.

It is found that the trough 52 may be of a length of two feet or more depending upon the rapidity of congealing or solidification of the chocolate on the bodies under the influence of the reduced temperature of the frozen bodies. The trough 52 inclined toward the sump 54 and the floor 30 of the container 25 inclined toward the sump 54 causes the excess chocolate collecting in the trough 52 and container 24 to flow in the sump 54.

Connected with the floor of the sump 54 is a tube or pipe 56 which conveys the collected chocolate to the supply (not shown) for recirculation to the chocolate dispensing means 34. As is conventional in chocolate coating processes, the supply of liquid chocolate is maintained at a flowable temperature by suitable heating means (not shown).

The process involves an apparatus or arrangement for applying controlled heat to the congealed chocolate coating on a body as it is advanced by the conveyor to render the coating on the body in a softened, tacky or viscous condition of a character or degree to receive and retain chopped nuts, nut pieces, fragments of edible cake or the like impinged or dispersed onto the coating but without causing the chocolate coating to flow or drip from the frozen bodies.

The chocolate-coated bodies are subjected to controlled heat applied at a station designated "B." The apparatus or arrangement at station "B" is illustrated in FIGS. 1, 3 and 4. In the embodiment illustrated, the heat is derived from flames directed toward the major or flat surfaces of the chocolate-coated bodies through combustion of a low pressure mixture of air and hydrocarbon gas such as propane, methane, butane or the like. The heating is accurately controlled because the heat applied to the congealed chocolate coating must be just sufficient to soften the coating to a tacky condition without rendering the chocolate flowable because dripping of the chocolate at the heat applying station "B" is undesirable.

Mounted upon the frame 10 are plates or members 60, shown in FIGS. 1 and 4, which may be welded or otherwise secured to the frame. Each of the plates 60 is provided with a T-shaped slot, each slot receiving flange portions 62 provided on member 64. Each of the plates 60 is provided with a slot 66 which accommodates a securing bolt 68 extending through an opening in the flange 62. The flanges 62 of members 64 are slidable in the T-shaped slots and provide for adjustment of the members 64 lengthwise of the slots 66, the members being held in adjusted position by drawing up nuts 69 on the bolts 68.

Securely mounted on each of the members 64 is a blower 70 having a housing 71 which contains a rotatable impeller 72 of conventional construction driven by an electric motor 73. Each blower is equipped with a circular plate or baffle 74 provided with air intake openings 76, the plates being adjustable to effect a desired degree of registration with openings 77 in a side wall of each blower to control or regulate the amount of atmospheric air admitted into the blower housing 71.

A means for supplying a combustible hydrocarbon gas or fuel gas into the blower is conventional and includes a fitting 82 opening into the blower at the central region of each plate 74, each fitting being connected by a pipe 84 with a supply (not shown) of hydrocarbon or fuel gas. A valve means 86 is connected with each pipe 84 for accurately controlling the amount of combustible gas admitted into each blower housing 71.

As particularly shown in FIG. 4, burners or heating means 88 are disposed in spaced relation so as to direct or impinge heat of the flames or hot gases of combustion of the fuel gas and air mixture against the chocolate coating on the major or flat surfaces of the chocolate-coated frozen bodies as they are conveyed between the burners 88 by the conveyor 12. The chocolate-coated frozen bodies or discs are designated 16b. The burners 88 in the embodiment illustrated include upwardly extending tubular members or tubes 90, the opposing wall region of each of the tubular members being provided with vertically disposed orifice means such as a slot 92.

The upper ends of the burner tubes 90 are provided with closures or caps 91. Each of the burners is supported by a blower housing 71 by means of a fitting 93, pipes 94, 96 and an L-shaped fitting 98, each pipe 96 being connected with a tubular portion 100 on the blower housing. A combustible mixture comprising fuel gas and air from the blower 70 is delivered through the burner slots or orifice means 92 and is ignited and burns exteriorly of the slots.

The flames or combustion gases are impinged against the chocolate coating on each major surface of a chocolate-coated frozen body 16b, the flames establishing a heated environment softening the chocolate coating during movement of a body 16b past the burners 88. The amount of combustible gas for each burner is regulated by a valve 86, and the amount of air in the combustible mixture is regulated by adjusting the plate 74 mounted on each blower.

The mixture delivery means of the burners may be in the form of one or more rows of small circular orifices as is conventional with gas burners in lieu of the elongated orifices or slots 92. The flames are of comparatively low velocity sufficient to soften the coating rendering the coating tacky.

The process includes a station "C" at which chopped nuts, nut pieces or fragments of crisp edible cake or other edible material are impelled or impinged against the chocolate-coated body with the chocolate in heat-softened condition whereby the material adheres to the chocolate coating. It is therefore desirable that station "C" at which the edible materials are impelled or impinged onto the chocolate coating be sufficiently close to station "B" at which the chocolate coating is softened so that the particulate edible material adheres to the softened chocolate.

In the illustrated embodiment, particulate edible material, such as chopped nuts, nut pieces, fragments of crisp edible cake or the like, are delivered into a chamber and the particulate material agitated in a manner to cause the material to be impelled or impinged into contact with the tacky chocolate coating whereby a substantial amount of the material is retained by the softened chocolate coating on the frozen bodies.

The apparatus at station "C" for carrying out this method step in the process is illustrated in FIGS. 1 and 5. The means 104 for applying the particulate edible material to the tacky chocolate coating on the bodies includes a thin walled hollow housing 106 of generally oval cross section as shown in FIG. 5. Journaled for rotation within the housing are shafts 108 and 110, each of the shafts being equipped with vanes or radially extending members 112 of the character shown in FIG. 5.

The shafts and vanes are rotated by an electrically energizable motor 114 which is mounted on an end wall of the housing 106. In the embodiment illustrated, the motor 114 directly drives the shaft 110. Transmission means is associated with the shafts whereby the shafts 108 and 110 are rotated in opposite directions. In the arrangement illustrated, the shafts 108 and 110 are provided respectively with gears 116 and 117.

Journally mounted on a portion 119 of the housing 106 are shafts 121 and 122 and mounted on the respective shafts are gears 124 and 125. The gear 116 is enmeshed with the gear 124 and the gear 117 is enmeshed with the gear 125. The gears 124 and 125 are enmeshed as illustrated schematically in FIG. 5. Through this arrangement the vanes 112 on the shafts 108 and 110 are rotated in opposite directions.

Each of the end walls of the housing 106 is provided with a slot 127 to accommodate the frozen bodies bearing the tacky chocolate coating as they are advanced by the conveyor 12. As shown in FIG. 5, the slot 127 in each end wall is of a width and depth to facilitate passage of the chocolate-coated bodies. Disposed adjacent the housing 106 is a hopper or container 132 containing a supply of chopped nuts, nut pieces, fragments of crisp edible cake or other particulate materials, the materials flowing through an exit opening 134 in the hopper 132 and are deflected by a baffle 138 into the housing 106 through an opening 136.

The motor 114 rotates the shafts 108 and 110 and the vanes 112 at a speed whereby the vanes engage the particulate edible materials and move or agitate them violently throughout the chamber 107 whereby the materials are randomly impinged or impelled by the rotating vanes into contact with the heat-softened or tacky chocolate coating on the bodies 16b as they move through the chamber 107 provided by the housing 106. Through this method substantial amounts of the particulate edible materials are embedded in or adhered to the heat-softened tacky chocolate on the bodies.

As the bodies bearing a coating of chocolate and particulate materials are moved away from the chamber 107, the bodies are reduced in temperature or cooled under the influence of the temperature of the ice cream or ice milk body causing the softened chocolate to congeal and retain the particulate materials delivered onto the softened chocolate within the chamber 107.

The transmission gearing above described for rotating the shaft 110 from the motor driven shaft 108 is enclosed by a suitable means (not shown). It is to be understood that other forms of transmission means may be employed for rotating the vanes or impellers 112.

In the illustrated embodiment the chamber 107 is of a length to accommodate concomitantly three frozen bodies but it is to be understood that the chamber 107 may be of greater or lesser length if desired. The lower end of the hopper 132 at the exit region is provided with conventional gating or valve means (not shown) for regulating or controlling the rate of delivery of particulate edible materials from the exit 134 into the chamber 107.

The process as carried on through the series of method steps is as follows: The conveyor motor (not shown) is energized by the operator setting into operation the conveyor 12 which moves in a right-hand direction. The pump (not shown) for delivering liquid chocolate composition for delivery onto the frozen bodies is brought into operation and the motors of the blowers 70 energized whereby combustible air and gas mixtures are delivered through the vertical slots 92. The mixtures are ignited exteriorly of the slots, and the motor 114 is energized for rotating the vanes 112 in the chamber 107.

As the frozen bodies or discs 16 of ice cream, ice milk or the like are conveyed through the chamber 28 provided by the receptacle 24 at station "A," the liquid chocolate under pressure from the pump is sprayed from the orifices 48 in the tubes 40 onto the major surfaces of the frozen bodies 16. As the sprays of liquid chocolate from the orifices 48 impinge the major surfaces of the frozen bodies 16 and sprays of chocolate from the orifices 50 impinge onto the peripheral portion of each frozen body, the impinging action causes the chocolate to be splashed so that the entire surface areas of the frozen bodies receive a coating of the chocolate.

As the chocolate-coated bodies move away from the chocolate applying station "A," excess liquid chocolate tends to drip from the frozen bodies, but as the chocolate is reduced in temperature by the low temperature of the frozen bodies, a coating of the chocolate congeals or solidifies and remains adhered to the frozen bodies. During this cooling of the chocolate which occurs as the coated frozen bodies are conveyed from the chamber 28 along the trough 52, the excess liquid or uncongealed chocolate drips or falls from the bodies into the trough 52 and is returned to the sump 54 together with the excess chocolate delivered into the chamber 28. The liquid chocolate collected in the sump 54 is returned through the tube 56 to the supply of chocolate for recirculation and redelivery from the orifices 48 in the chamber 28.

The frozen bodies having congealed chocolate coatings are indicated at 16b and are moved by the conveyor 12 through the heat applying or heated environment at station "B." At station "B" the flames of the combusting gaseous fuel and air mixtures from the vertical slots or orifices 92 direct heat against both major or flat surfaces of the chocolate-coated bodies 16b, the heating being accurately controlled by adjusting the fuel gas valves 86 and the air flow adjustment openings 76, 77 so that just sufficient heating of the chocolate coating occurs to render the coating soft and tacky or viscous, the amount of heat being insufficient to cause the chocolate coating to flow or drip from the frozen bodies.

The chocolate-coated frozen bodies, after moving through the chocolate heat-softening step in the process at station "B," immediately enter the chamber 107 provided by the housing 106. As the frozen bodies with the tacky chocolate coating move through the chamber 107, the rotating vanes 112 impel or impinge the particulate edible material, such as chopped nuts, nut pieces, cake fragments, or other crisp edible material, randomly onto the tacky chocolate coating. A substantial quantity of the particulate edible material adheres to the chocolate coating.

As the end product 16c, indicating the chocolate-coated frozen body on a stick with the layer of chopped nuts, nut pieces or crisp edible material 102 adhering to the chocolate, moves away from station "C," the chocolate coating is again congealed or solidified under the influence of the reduced temperature of the frozen body whereby the chopped nuts or nut pieces adhering to the chocolate coating are permanently retained by the coating.

While the ingredients comprising the chocolate coating may vary, it is found that a chocolate composition comprising about 70% edible vegetable oil and 30% cocoa and other minor ingredients has been satisfactory for the purpose.

FIG. 6 illustrates a modified arrangement or unit 142 for providing a heated environment or directing heat onto the chocolate-coated bodies at station "B." In the arrangement or unit 142, illustrated in FIG. 6, electric energy is utilized for heating air directed onto the coated bodies. FIG. 6 illustrates one heating means positioned at one side of advancing chocolate-coated bodies but it is to be understood that a second heating means is disposed at the opposite side region of the chocolate-coated bodies in the manner illustrated in FIG. 3.

The apparatus shown in FIG. 6 includes a tube or tubular means 144 disposed at one side of chocolate-coated bodies 16b' being advanced by the conveyor through the heated environment. The tubular means 144 is mounted on a fitting 146 connected by means of a pipe 148 with an air blower 70'.

The blower is supported upon a member 64' adjustably mounted on a plate 60' carried by support frame 10', the construction being substantially the same as that shown in FIG. 3. The blower 70' is adjustable with respect to the plate 60' and may be locked in adjusted position by means of a bolt 68' and a nut 69'. Through this arrangement each of the heating units is adjustable with respect to the bodies 16b being conveyed between the units by the conveyor. Thus, adjusting the position of the units with respect to the chocolate-coated bodies regulates in a measure the effective heating of the chocolate coating on the bodies.

The tubular means 144 is provided with an elongated orifice means or slot 92' for the delivery of heated air under comparatively low velocity toward the chocolate-coated bodies. Air is admitted to the central region of the blower 70' through openings 76' in an adjustable plate 74'. The housing 71' of the blower 70' is provided with openings 77' arranged whereby adjustment or relative rotation of the plate 74' regulates or controls the amount of air admitted to the blower through the sets of openings 76' and 77'.

The heating unit 142 includes an electrically energizable resistance heater or heating element 152 disposed within the tubular means 144 which heats the air supplied to the tube from the blower 70' so that a heated environment is established at the opposite sides of the chocolate bodies 16b for softening and rendering the chocolate tacky for the purposes hereinbefore described.

In the arrangement shown in FIG. 6, insulating members 156 and 158 are respectively mounted on an end cap 159 at the upper end of the tube 144 and at the lower end of the fitting 146. The insulating members 156 and 158 electrically insulate the heating means or heating element 152 from the metal components of the heating unit. A conventional electric current supply is connected to conductors L1 and L2 which convey current to the respective ends of the heating element 152. A controller 163 is intercalated in conductor L1 for controlling flow of electric energy to the heating element 152 and thereby providing control for the heating of the air delivered into the tube 144 by the blower 70".

While a resistance heating element arrangement is illustrated for supplying heated air, it is to be understood that an electrically energizable radiant heating means may be employed to provide a heated environment through which the chocolate-coated bodies are advanced for rendering the chocolate coating viscous or tacky prior to the conveyance of the bodies through the chamber 107 in which particulate edible materials are impelled or impinged onto the tacky chocolate coating of the bodies.

It is apparent that, within the scope of the invention, modifications and different arrangements may be made other than as herein disclosed, and the present disclosure is illustrative merely, the invention comprehending all variations thereof.

I claim:

1. Apparatus for processing chocolate-coated frozen bodies of confection including, in combination, a movable conveyor, said conveyor supporting the chocolate-coated bodies, the chocolate coating on the bodies solidifying on the bodies under the influence of the reduced temperature of the bodies, a source of heat adjacent the conveyor arranged to direct heat onto the solidified chocolate coating on the bodies as the bodies are moved by the conveyor past the heat source to soften the chocolate coating to a tacky condition, a chamber containing particulate edible material through which the bodies having the softened chocolate coating are advanced by the conveyor, and a rotatable member in the chamber having vanes for impinging the particulate edible material onto the tacky chocolate coating on the bodies whereby substantial amounts of the particulate edible material are adhered to the coating on the bodies.

2. Apparatus for processing frozen bodies of confection including, in combination, a movable conveyor having means for mounting frozen bodies of confection, means for spraying a coating of chocolate on the bodies mounted by the conveyor, the chocolate coating solidifying on the bodies under the influence of the reduced temperature of the bodies, means providing a heat source arranged to direct heat onto the chocolate-coated bodies for softening the solidified chocolate coating on the bodies to render the chocolate tacky, a chamber containing particulate edible material through which the bodies having a softened chocolate coating are conveyed by the conveyor, and rotatable means in the chamber for impinging the particulate edible material onto the tacky chocolate coating whereby substantial amounts of the particulate edible material are adhered to the tacky chocolate coating on the bodies.

3. Apparatus for processing frozen bodies of confection including, in combination, a movable conveyor having means for mounting frozen bodies of confection, a container, means in the container for delivering liquid chocolate from a supply onto the bodies mounted by the conveyor, a coating of the chocolate congealing on the frozen bodies under the influence of the reduced temperature of the bodies, a source of heat adjacent the conveyor arranged to direct heat onto the congealed chocolate coating on the bodies as the bodies are moved by the conveyor past the heat source for softening the congealed chocolate to a tacky condition, a chamber disposed adjacent the source of heat through which the bodies having softened chocolate coating are conveyed by the conveyor, said chamber adapted to contain particulate edible material, a rotatable member in said chamber having vanes for impinging the particulate edible material onto the softened chocolate on the frozen bodies whereby substantial amounts of the particulate edible material are adhered to the chocolate coating on the bodies.

4. The combination according to claim 3 including a trough associated with the container for collecting excess chocolate falling from the bodies, and tubular means for returning the collected excess chocolate to the supply.

5. The combination according to claim 3 wherein the source of heat comprises burner means, and means for supplying fuel and air mixture to the burner means whereby the gases of combustion of the burning mixture are directed against the chocolate coating on the bodies.

6. Apparatus for processing frozen bodies of confection including, in combination, a movable conveyor, means spaced along the conveyor for suspending frozen bodies of confection, a container, means for spraying liquid chocolate from a supply on the frozen bodies as they are moved by the conveyor through the container, means associated with the container for collecting excess chocolate falling from the frozen bodies, tubular means for returning the excess chocolate to the supply, the chocolate on said bodies being solidified as a coating on the bodies under the influence of the reduced temperature of the frozen bodies, burner means, means for supplying a fuel and air mixture to the burner means whereby combusting the fuel and air mixture provides hot gases of combustion directed into contact with the coating of chocolate on the bodies to soften the chocolate to a tacky condition, a housing defining a chamber, said housing having passage means through which the bodies having softened chocolate coating are conveyed through the chamber by the conveyor, means constituting a supply of particulate edible materials for delivery into the housing, rotatable vanes in the housing for impelling the particulate edible material into contact with the softened chocolate on the bodies whereby substantial amounts of particulate edible material are adhered to the softened chocolate on the bodies, and motive means for rotating the vanes.

7. The combination according to claim 6 wherein the means for collecting the excess liquid chocolate from the bodies comprises a trough, a sump having connection with the container and the trough, said tubular means for returning excess chocolate to the supply being connected with the sump.

8. The combination according to claim 6 wherein the means for supplying fuel and air to the burner means includes blower means, adjustable means on the blower means for regulating admission of air into the blower, and valve means for regulating the admission of fuel from a supply to the blower means.

9. The combination according to claim 6 including adjustable mounting means for adjusting the position of the burner means relative to the chocolate-coated bodies moving past the burner means.

* * * * *